(12) United States Patent
Haskara et al.

(10) Patent No.: US 8,195,379 B2
(45) Date of Patent: Jun. 5, 2012

(54) MULTI-PULSE INJECTION FUEL AND LOAD BALANCING CONTROL SYSTEM

(75) Inventors: Ibrahim Haskara, Macomb, MI (US); Yue-Yun Wang, Troy, MI (US); Chol-Bum M. Kweon, Rochester, MI (US); Frederic Anton Matekunas, Troy, MI (US); Oguz H. Dagci, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

(21) Appl. No.: 12/686,593

(22) Filed: Jan. 13, 2010

(65) Prior Publication Data

US 2011/0172899 A1    Jul. 14, 2011

(51) Int. Cl.
*F02B 3/00* (2006.01)
*F02B 3/04* (2006.01)
(52) U.S. Cl. ......................................... 701/104; 123/299
(58) Field of Classification Search ................... 701/103, 701/104; 123/299, 300, 305, 435, 478
See application file for complete search history.

(56) References Cited

U.S. PATENT DOCUMENTS

| 5,960,627 | A  | * | 10/1999 | Krampe et al. ................. 60/274 |
| 7,594,493 | B2 |   | 9/2009  | Matekunas et al. |
| 7,904,233 | B2 |   | 3/2011  | Kweon et al. |
| 2010/0089362 | A1 |   | 4/2010  | Haskara et al. |

OTHER PUBLICATIONS

U.S. Appl. No. 12/775,570, Haskara et al.

* cited by examiner

*Primary Examiner* — Mahmoud Gimie

(57) ABSTRACT

A method for adjusting fuel injection quantities in an internal combustion engine configured to operate multi-pulse fuel injections in a cylinder of the engine includes monitoring in-cylinder pressure, determining a burnt fuel mass for main combustion based upon the in-cylinder pressure, determining a burnt fuel mass for post combustion based upon the in-cylinder pressure, determining a main fuel quantity offset based upon the burnt fuel mass for main combustion, determining a post fuel quantity offset based upon the burnt fuel mass for post combustion, and controlling fuel injections into the cylinder based upon the main fuel quantity offset and the post fuel quantity offset.

17 Claims, 5 Drawing Sheets

MULTI-PULSE INJECTION FUEL AND LOAD BALANCING CONTROL SYSTEM

TECHNICAL FIELD

This disclosure relates to operation and control of internal combustion engines.

BACKGROUND

The statements in this section merely provide background information related to the present disclosure and may not constitute prior art.

Methods are known to control multi-pulse fuel injections within a combustion cycle. Injections in different portions of the combustion cycle have different effects upon the resulting combustion cycle, including effects upon work output of the engine, emissions, and combustion stability. Methods are additionally known to control, adjust, or correct fuel quantities injected in each of the multi-pulse fuel injections, for example, by monitoring an engine load and utilizing calibrated values to determine an appropriate mix of fuel quantities. However, such methods are only as accurate as the calibration values allow. Further, it will be appreciated that such methods are reactive and include a time lag, controlling engine operation some period after the measurement of the inputs. It will additionally be appreciated that engine output is a term described for an entire engine, and generally cannot provide particular information about the combustion occurring in a particular cylinder.

A variety of intrusive and non-intrusive pressure sensing devices are known for sensing pressure within an internal combustion engine cylinder when the engine is motoring and when the engine is firing. In-cylinder pressure measurements can be utilized to estimate different aspects of a combustion cycle. Such pressure measurements can be measured and processed in real time during the operation of the engine. Additionally, such pressure measurements can be tracked on a cylinder-by-cylinder basis.

SUMMARY

A method for adjusting fuel injection quantities in an internal combustion engine configured to operate multi-pulse fuel injections in a cylinder of the engine includes monitoring in-cylinder pressure, determining a burnt fuel mass for main combustion based upon the in-cylinder pressure, determining a burnt fuel mass for post combustion based upon the in-cylinder pressure, determining a main fuel quantity offset based upon the burnt fuel mass for main combustion, determining a post fuel quantity offset based upon the burnt fuel mass for post combustion, and controlling fuel injections into the cylinder based upon the main fuel quantity offset and the post fuel quantity offset.

BRIEF DESCRIPTION OF THE DRAWINGS

One or more embodiments will now be described, by way of example, with reference to the accompanying drawings, in which.

DETAILED DESCRIPTION

Figure 1:
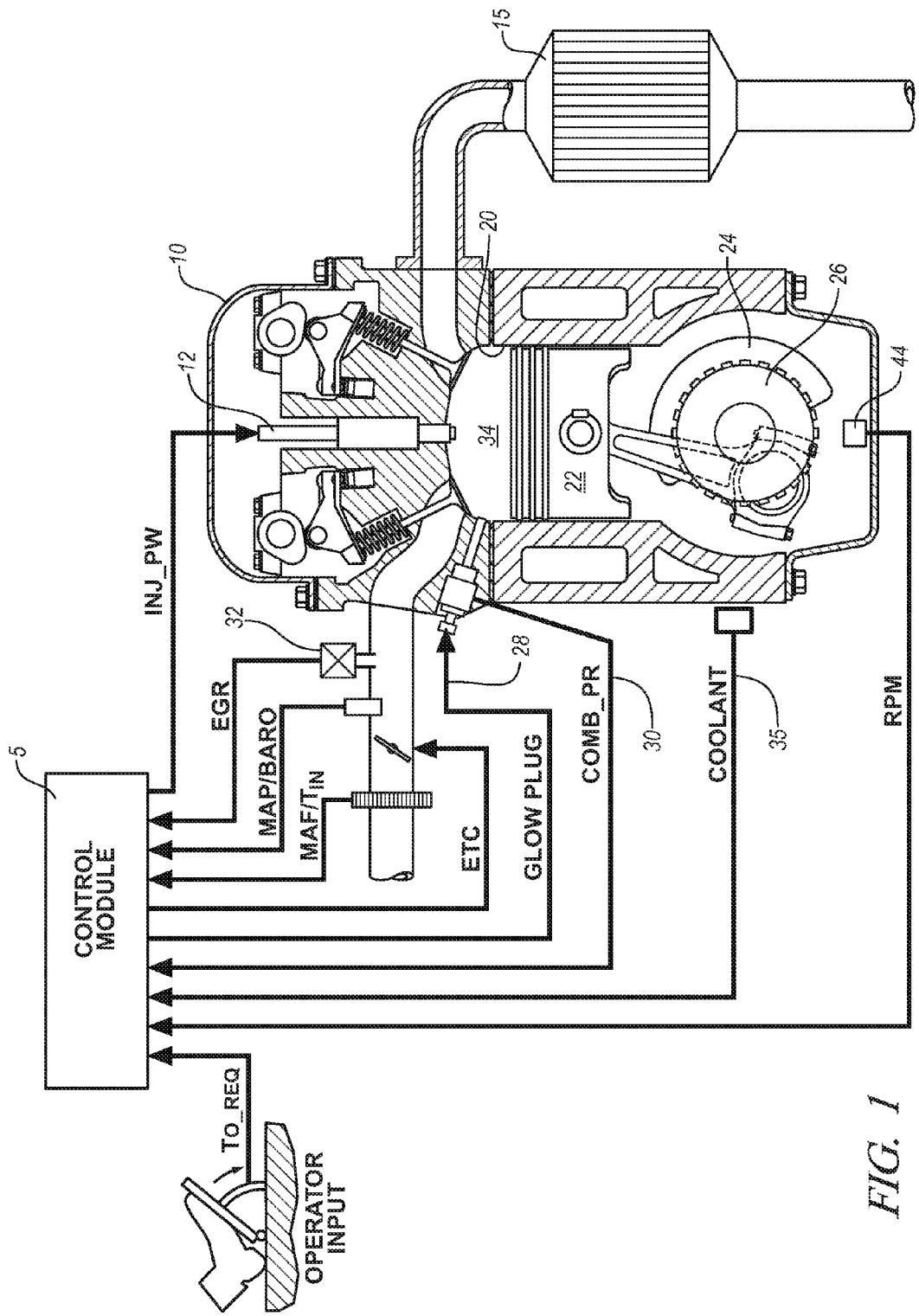
FIG. 1 is a sectional view of an internal combustion engine configured according to an exemplary embodiment of the present disclosure.

Referring now to the drawings, wherein the showings are for the purpose of illustrating certain exemplary embodiments only and not for the purpose of limiting the same, FIG. 1 is a schematic diagram depicting an exemplary internal combustion engine 10, control module 5, and exhaust aftertreatment system 15, constructed in accordance with an embodiment of the disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably includes a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, including a crank sensor 44 for monitoring crankshaft speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 (RPM) is input to the control module 5. There is a combustion pressure sensor 30, including a pressure sensing device adapted to monitor in-cylinder pressure (COMB_PR). The combustion pressure sensor 30 preferably includes a non-intrusive device including a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 includes a piezo-ceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 monitoring coolant temperature (COOLANT). The system may include an exhaust gas sensor for monitoring states of one or more exhaust gas parameters, e.g., temperature, air/fuel ratio, and constituents. One skilled in the art understands that there may other sensing devices and methods for purposes of control and diagnostics. The operator input, in the form of the operator torque request, ($T_{O\_REQ}$), is typically obtained through a throttle pedal and a brake pedal, among other devices. The engine is preferably equipped with other sensors for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). There is an exhaust gas recirculation valve 32 and cooler, which controls flow of externally recirculated exhaust gas to the engine intake, in response to a control signal (EGR) from the control module.

The glow-plug 28 includes a known device, installed in each of the combustion chambers, adapted for use with the combustion pressure sensor 30.

The fuel injector 12 is an element of a fuel injection system, which includes a plurality of high-pressure fuel injector devices each adapted to directly inject a fuel charge, including a mass of fuel, into one of the combustion chambers in response to the command signal, INJ_PW, from the control module. Each of the fuel injectors 12 is supplied pressurized fuel from a fuel distribution system, and have operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

In exemplary diesel engine applications, multi-pulse injection strategies enabled by high rail-pressure systems are used for combustion optimization through improved heat release shaping during a combustion event. Among the strategies, split injection and post combustion injection bring additional challenges as compared to "main-injection only" combustion since combustion takes place in multiple steps or as multiple stage combustion. Corresponding fuel-balancing algorithms find a delta fuel quantity for individual cylinders per injection event to balance the load among cylinders based on a single load metric such as indicated mean effective pressure (IMEP). However, one having ordinary skill in the art will appreciate that such methods lack an ability to balance fuel injected in multi-pulse injections in real-time based upon a single load metric.

Combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion cycle may be described as an estimated state of combustion. By estimating the state of the combustion process for a cylinder and comparing the state to either expected cylinder readings or to the readings of other cylinders, cylinders may be controlled efficiently based upon comparing monitored operation to desired operation.

As described above, common fuel-balancing algorithms find a delta fuel quantity for individual cylinders per combustion event to balance the load among cylinders based on a single load metric such as IMEP. Such a method can be summarized by the following equations.

$$IMEP = \int P(dV/V) = f(Q_{main}, Q_{post}) \quad [1]$$

$$IMEP \approx \frac{\partial f}{\partial Q_{main}} \Delta Q_{main} + \frac{\partial f}{\partial Q_{post}} \Delta Q_{post} + f(\overline{Q}_{main}, \overline{Q}_{post}) \quad [2]$$

$$IMEP \approx \frac{\partial f}{\partial Q_{main}} g \Delta Q + \frac{\partial f}{\partial Q_{post}} (1-g) \Delta Q + f(\overline{Q}_{main}, \overline{Q}_{post}) \quad [3]$$

$Q_{main}$ and $Q_{post}$ are injection quantities commanded for the main and post injections, respectively. $\overline{Q}_{main}$ and $\overline{Q}_{post}$ describe unmodified injection amounts for main and post injections, determinable by methods known in the art, for example, according to look-up tables based upon factors such as an operator torque request. The functional relationship is determinable by experimentation or modeling sufficient to predict operation of the cylinder and may include different functional relationships based upon specific conditions or operating ranges. $\Delta Q$ can be defined as a global error for the combustion cycle. One having ordinary skill in the art will appreciate that $\Delta Q$ describes the difference of the total fuel burnt of a particular cylinder relative to a desired target or all-cylinder average and is used to adjust the fuel commanded for a desired or balanced engine operation. $\Delta Q_{main}$ and $\Delta Q_{post}$ describe changes for injection quantities commanded for the main and post injections, respectively. In the exemplary injection strategy of Equations 1-3, wherein the total injection in the combustion cycle includes a single main injection and a single post injection, the sum of these injections is the total injection. Similarly, the global error or correction to the injections, $\Delta Q$, equals the sum of the errors or corrections for the single main and post injections, $\Delta Q_{main}$ and $\Delta Q_{post}$.

Equation 1 describes IMEP or the work performed by the combustion cycle according to a commonly known formula. Also, this work is said to be a function of an injection amount commanded in the main injection and post injection. Equation 2 describes in greater detail the functional relationship between injection quantities and IMEP, breaking the functional relationship down into a portion describing the effect of $\Delta Q_{main}$, a portion describing the effect of $\Delta Q_{post}$, and a portion describing the effect of $\overline{Q}_{main}$ and $\overline{Q}_{post}$. Equation 3 introduces the parameter g to correlate $\Delta Q_{main}$ and $\Delta Q_{post}$ according to a common term $\Delta Q$, describing a total change in injection quantity for the combustion cycle. For a value of g equal to zero, IMEP is balanced with only main injection quantity adjustments.

One having ordinary skill in the art will appreciate that a number of injection strategies and splits are known in the art. Consideration in using equivalent equations to Equations 1-3 must take into account the specific injection strategies utilized. For example, one having ordinary skill in the art will appreciate that injections in different parts of the combustion cycle will have different effects. A pilot injection occurring before main combustion is typically a small quantity and balancing the pilot injections between cylinders is typically not feasible. Therefore, specific equations balancing injections and determining $\Delta Q$ based upon IMEP can but will not necessarily include a term for $\Delta Q_{pilot}$, even if such a term exists for the specific injection strategy. Similarly, if multiple main injections are utilized, then a number of $\Delta Q_{main}$ values, $\Delta Q_{main,1}$ through $\Delta Q_{main,N}$, can be required. Similarly, if multiple post injections are utilized, then a number of $\Delta Q_{post}$ values, $\Delta Q_{post,1}$ through $\Delta Q_{post,N}$, can be required. Distribution of an overall $\Delta Q_{main}$ or $\Delta Q_{post}$ among a plurality of multiple main or post injections can be split evenly or can be split according to differing or optimal effects of different quantities at different points in the combustion cycle according to methods known in the art. A number of similar injection strategies and related terms can be required to perform methods described herein. The embodiments of injection strategies described herein are exemplary, and similar injection strategies and terms useful to control such strategies can be developed according to methods known in the art.

Utilizing an input such as IMEP is useful to describe an output of a cylinder. However, one having ordinary skill in the art will appreciate that IMEP is a metric limited to describing an output of the entire combustion cycle. One method to make corrections or control adjustments within the combustion cycle is disclosed utilizing preset or baseline injection quantities to define an injection split for any corrective injection quantity. Assuming a default value of g to maintain an original split between the main and post injections, an equation for g can be expressed by the following equation.

$$g = \frac{\overline{Q}_{main}}{\overline{Q}_{main} + \overline{Q}_{post}} \quad [4]$$

In this way, given a load value, IMEP, a term can be developed to set injection quantities for main and post injections.

The above method, utilizing baseline injection quantities to define an injection split for a corrective injection quantity is useful to apportion $\Delta Q$ between $\Delta Q_{main}$, and $\Delta Q_{post}$ based upon IMEP. However, such a method is limited by the limited utility of IMEP, describing only the overall output of the cylinder and offers no insight into particular parts of a combustion cycle within the cylinder. Methods are known to track combustion characteristics in real-time and throughout individual combustion cycles, for example, through analysis of in-cylinder pressure measurements. By extracting from pressure measurements information regarding fuel burnt through a combustion cycle in a cylinder, determinations can be made to set injection quantities for main and post injections in real-time. Fuel burnt through portions of the combustion cycle, $\Delta m_f$, can be calculated according to the following equations.

$$m_{fuel} = \frac{\partial f}{\partial Q_{main}} \Delta Q_{main} + \frac{\partial f}{\partial Q_{post}} \Delta Q_{post} + f(\overline{Q}_{main}, \overline{Q}_{post}) \quad [5]$$

$$m_{fuel} = \sum_{\theta_{ini}}^{\theta_{final}} \Delta m_f = \sum_{\theta_{ini}}^{\theta_{post}} \Delta m_f + \sum_{\theta_{post}}^{\theta_{final}} \Delta m_f \quad [6]$$

$$m_{fuel,main} = \sum_{\theta_{ini}}^{\theta_{post}} \Delta m_f, \quad m_{fuel,post} = \sum_{\theta_{post}}^{\theta_{final}} \Delta m_f \quad [7]$$

$$\begin{bmatrix} m_{fuel,main} \\ m_{fuel,post} \end{bmatrix} = \begin{bmatrix} G_{11} & 0 \\ G_{12} & G_{22} \end{bmatrix} \begin{bmatrix} \Delta Q_{main} \\ \Delta Q_{post} \end{bmatrix} \quad [8]$$

The term $m_{fuel}$ describes a total fuel burnt through the combustion cycle. The term $m_{fuel,main}$ describes the fuel burnt prior to the post injection. The term $m_{fuel,post}$ describes the fuel burnt after the post injection. Equation 5 describes $m_{fuel}$ as a function of the fuel injection commands throughout the combustion cycle. Equation 6 describes $m_{fuel}$ alternatively as a sum of fuel burnt through portions of the combustion cycle, $\Delta m_f$, or as a sum of fuel burnt through portions of the combustion cycle during main combustion, $\Delta m_f$ from $\theta_{ini}$ to $\theta_{post}$, and fuel burnt through portions of the combustion cycle during post combustion, $\Delta m_f$ from $\theta_{post}$ to $\theta_{final}$. $\theta_{post}$ can be selected by any method sufficient to quantify the difference between main combustion and post combustion. In one exemplary embodiment $\theta_{post}$ can be selected based upon the initiation of the post injection or a first post injection. $\theta_{final}$ can be selected by any method sufficient to quantify an end to combustion. In one exemplary embodiment $\theta_{final}$ can be selected at a crank angle whereby combustion is known to end, for example, in many embodiments, a crank angle of 90 degrees after top dead center can be used. Equation 7 describes $m_{fuel,main}$ and $m_{fuel,post}$ as the component terms summed in Equation 6.

Equation 8 describes the relationship between $m_{fuel,main}$, $m_{fuel,post}$, $\Delta Q_{main}$, and $\Delta Q_{post}$ determinable from Equations 5 through 7. One having ordinary skill in the art will appreciate that Equation 8 expresses $m_{fuel,main}$ as a term directly determinable from a single term, $G_{11}$, times $\Delta Q_{main}$. This relationship describes that, in a system utilizing two measurements of cylinder pressure, one at the end of main combustion and another after the end of post combustion, treating $m_{fuel,main}$ as a desired or known term, $\Delta Q_{main}$ is directly determinable from the pressure measurement taken at the end of main combustion. One having ordinary skill in the art will further appreciate that Equation 8 expresses $\Delta Q_{post}$ as a term requiring determination of two distinct terms, $G_{12}$ and $G_{22}$, in combination with $m_{fuel,post}$. This relationship describes that, in the system utilizing two measurements of cylinder pressure described above, treating $m_{fuel,post}$ as a desired or known term, $\Delta Q_{post}$ requires computation based upon both pressure measurements. In one exemplary embodiment, a PI control, known in the art and utilizing the relationships described in Equation 8, automatically monitors the measured values, $m_{fuel,main}$, $m_{fuel,post}$, and adjusts injection quantities based upon the relationships.

Figure 2:
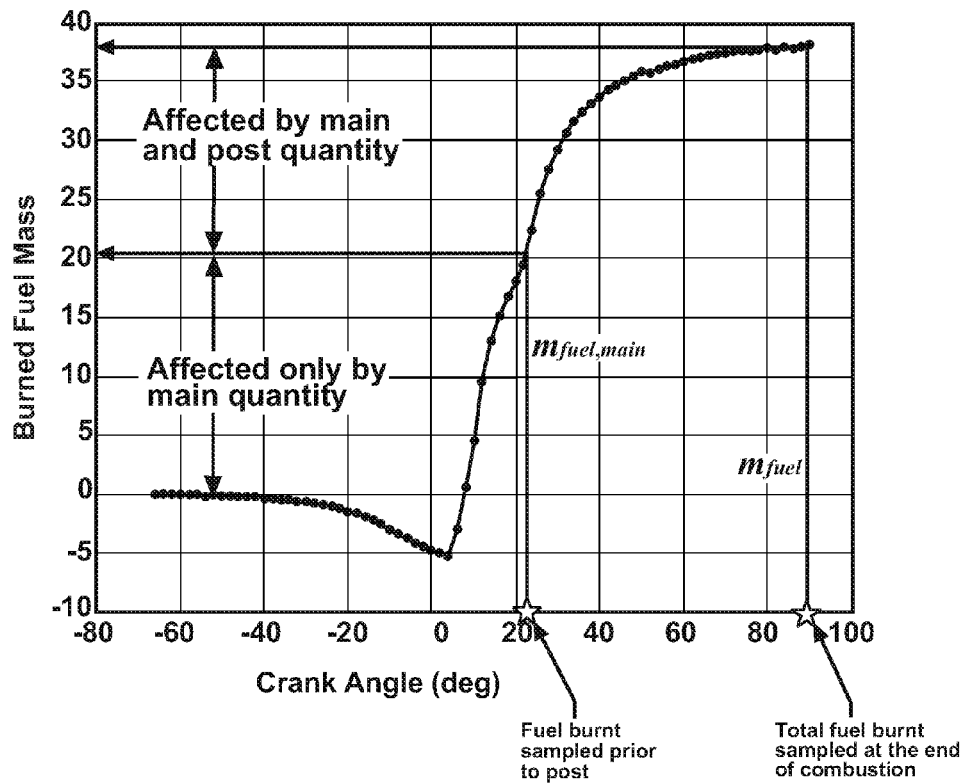
FIG. 2 graphically depicts burned fuel mass through an exemplary combustion cycle, in accordance with the present disclosure.

As described above, $m_{fuel}$, $m_{fuel,main}$, and $m_{fuel,post}$ can be utilized as known inputs to determine $\Delta Q_{main}$ and $\Delta Q_{post}$ values. FIG. 2 graphically depicts burned fuel mass through an exemplary combustion cycle, in accordance with the present disclosure. One having ordinary skill in the art will appreciate that in-cylinder pressure measurements can be utilized to calculate burnt fuel mass as depicted. In the exemplary plot of FIG. 2, a combustion cycle with a two-pulse fuel injection event is depicted, with a first, main injection and a second, post injection. As is evident in the graph, fuel masses burnt by different points in the combustion cycle, measurable according to crank angle degrees, can be defined or determined Further, according to methods known in the art, periods of main and post combustion can be defined, wherein the period of main combustion defines a power output of the cylinder and the period of post combustion defines a chemical composition of the exhaust gases expelled from the engine into the exhaust system. It will also be appreciated that a period of pilot combustion can also be operated to control factors such as combustion noise. Methods described herein to control main and post injections can similarly be utilized to control pilot injections. Analysis of the burnt fuel mass such as is depicted in FIG. 2 can be used to describe various properties of the combustion curve, for example, describing measured burnt fuel mass for main combustion and measured burnt fuel mass for post combustion values. As described above in Equations 5 through 8, analysis of the burnt fuel mass of a combustion cycle in a particular cylinder can be used to independently adjust injection timings or injection amounts based upon the analysis. These adjustments can be made on a cycle by cycle basis, or adjustments can be made based upon a plurality of subsequent combustion cycles wherein proper adjustments can be made predictably. A method is disclosed to utilize in-cylinder pressure measurements to compute burnt fuel mass useful to correct and balance in a closed loop fuel injected in multiple pulses, describing corrected quantities or a corrected ratio of main and post injections through a combustion cycle.

It will be appreciated that $\Delta Q_{main}$ and $\Delta Q_{post}$ will frequently be subject to a constraint, based upon a desired output of the engine, that the total fuel per cycle must remain fixed despite any balancing requirements. One having ordinary skill in the art will appreciate that the above equations can be applied to a single cylinder, individually balancing injections within the cylinder. In a multiple cylinder engine, such a method can be run for each individual cylinder, thereby balancing main and post injections for each cylinder without respect to an overall balancing between the cylinders. Such a system can additionally balance between the various cylinders according to methods known in the art. In one exemplary embodiment, each cylinder is controlled by a PI (proportional-integral) controller device, known in the art, and each PI controller is set to a desired fuel burnt value common across the cylinders and individually adjusts fuel injection amounts based upon the common desired fuel burnt value according to the disclosed methods.

In controlling a group of cylinders according to the methods described herein, the different cylinders can be controlled according to a common $m_{fuel}$ value determined by methods known in the art. Alternatively, a method is disclosed whereby $m_{fuel}$, $m_{fuel,main}$ or $m_{fuel,post}$ can be determined dynamically based upon in-cylinder pressure measurements and then utilized as a desired total fuel burnt through the combustion cycle. As described in association with in-cylinder pressure, measured burnt fuel mass for main combustion and measured burnt fuel mass for post combustion values can be determined or measured for a certain cylinder by measuring in-cylinder pressures. A desired value for $m_{fuel}$, $m_{fuel,main}$ or $m_{fuel,post}$ can be set by finding an average of measured burnt fuel mass values across cylinders and setting the respective desired $m_{fuel}$, $m_{fuel,main}$ or $m_{fuel,post}$ value to the calculated average. Each cylinder can employ a PI control to adjust an injection quantity. In one embodiment, control of one cylinder can be adjusted on the basis of a sum of all of the other cylinders PI controllers controlling a similar injection pulse, resulting in a number of PI controllers per injection pulse one less than the number of cylinders.

In an alternative or additional embodiment, as a diagnostic tool, an alert can be issued describing an anomaly if a certain cylinder's measured burnt fuel mass is different from a desired value by more than a threshold.

As described herein, methods are disclosed to compute and sample a fuel burnt trace of a particular cylinder to be able detect/control individual pulses simultaneously whether to a set value or a value determined by averaging among cylinders. However, even if the cylinder is operating with main only combustion/injection, the main injection can still be controlled with the main only or final fuel-burnt metric, either to a set target or to a dynamic target averaged among cylinders. In this way, the methods employed herein can be expanded for use in single injection or main only injection combustion operation.

Figure 3:
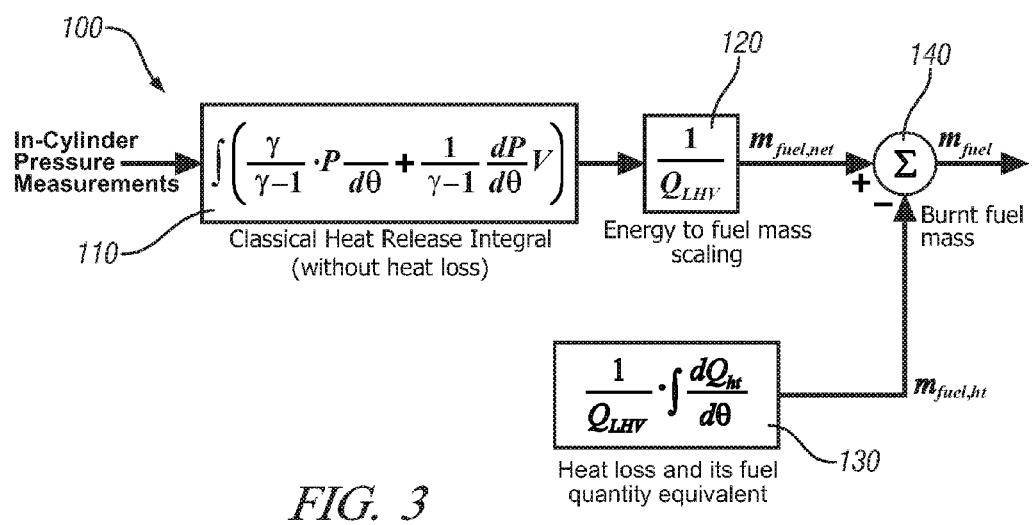
FIG. 3 schematically illustrates an exemplary process determining burnt fuel mass through application of a classical heat release integral, in accordance with the present disclosure.

As described above, $m_{fuel}$, $m_{fuel,main}$ or $m_{fuel,post}$ can be determined based upon in-cylinder pressure measurements. A number of methods to calculate burnt fuel mass from monitored in-cylinder pressure measurements are disclosed or envisioned. A first exemplary method to calculate burnt fuel mass utilizes a traditional heat release integral. FIG. 3 schematically illustrates an exemplary process determining burnt fuel mass through application of a classical heat release integral, in accordance with the present disclosure. Process 100 includes heat release integral module 110, energy to fuel mass scaling module 120, heat loss and fuel quantity equivalent module 130, and summation module 140. Heat release integral module 110 inputs in-cylinder pressure measurements and integrates a calculation of heat release through a combustion cycle, the calculation neglecting an effect of heat loss. This integration of heat release through the combustion cycle can be expressed as $dQ_{ch}/d\theta$ and integrated to describe the net energy released in the form of heat. Through derivations, this heat release may be expressed through the following equation.

$$Q = \int \frac{dQ_{ch}}{d\theta} = \int \left( \frac{\gamma}{\gamma-1} p \frac{dV}{d\theta} + \frac{1}{\gamma-1} V \frac{dp}{d\theta} \right) \quad [9]$$

Gamma, $\gamma$, includes a ratio of specific heats and is nominally chosen as that for air at the temperature corresponding to those used for computing the signal bias and without EGR. Thus, nominally or initially $\gamma=1.365$ for diesel engines and nominally $\gamma=1.30$ for conventional gasoline engines. These can however be adjusted based on the data from the specific heats for air and stoichiometric products using an estimate of the equivalence ratio, $\phi$, and EGR molar fraction targeted for the operating condition and using the following equation.

$$\gamma = 1 + (R/c_v) \quad [10]$$

R is the universal gas constant, and the weighted average of air and product properties can be calculated through the following equation.

$$c_v(T) = (1.0 - \phi^* EGR)^* c_{vair}(T) + (\phi^* EGR)^* c_{vstoichprod}(T) \quad [11]$$

Equation 11 can be expressed as a function to perform property corrections, taking into account various changing property relationships affecting combustion. Equation 11 can be utilized through a combustion cycle or at every crank angle during all pressure measurement angles starting from an initial temperature. The initial temperature may be at a bias computation point or some other reference such as the intake manifold temperature, measured for example at the intake valve closing angle. This initial temperature and pressure measurements are used to compute a mean temperature at any angle since the temperature undergoes changes similarly to pressure. It will additionally be appreciated that EGR changes through combustion, wherein initially EGR is the EGR percentage of the inducted gas and during the combustion fresh charge mass converts to EGR mass. EGR can accordingly be updated at each crank angle. Module 110 applies the integration determination of Equation 9 based upon pressure measurements and outputs a result to energy to fuel mass scaling module 120. Module 120 takes this input and divides by $Q_{LHV}$ or a measure of heat energy in a unit mass of fuel and outputs a burnt fuel mass measure for the combustion cycle not including heat loss or $m_{fuel,net}$. Heat loss and fuel quantity equivalent module 130 determines a heat loss component neglected in module 110. Module 130 integrates heat loss per unit of combustion cycle progression through the combustion cycle, the heat loss determinable through methods well known in the art, and divides the result by $Q_{LHV}$, similar to the operation of module 120, in order to output a burnt fuel mass equivalent heat loss term or $m_{fuel,ht}$. Summation module 140 inputs $m_{fuel,net}$ and $m_{fuel,ht}$, sums the results, and determines $m_{fuel}$ or burnt fuel mass for the combustion cycle. In this way, pressure measurements can be utilized through a classical heat release model to determine burnt fuel mass.

Figure 4:
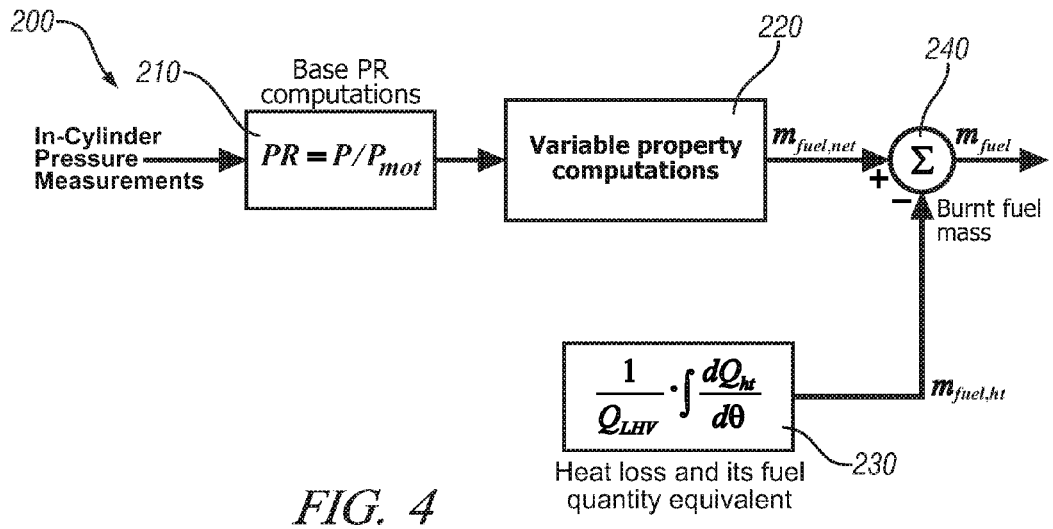
FIG. 4 schematically illustrates an exemplary process determining burnt fuel mass through application of a pressure ratio and variable property computations, in accordance with the present disclosure.

A second exemplary method to calculate burnt fuel mass utilizes a pressure ratio developed from in-cylinder pressure measurements and variable property computations. FIG. 4 schematically illustrates an exemplary process determining burnt fuel mass through application of a pressure ratio and variable property computations, in accordance with the present disclosure. Process 200 includes pressure ratio computation module 210, variable property computation module 220, heat loss and fuel quantity equivalent module 230, and summation module 240. Pressure ratio, PR, is a term known in the art to describe a measured pressure within the combustion chamber resulting from combustion, P, above the pressure that would normally be present through operation of the piston, $P_{MOT}$. An equation for PR can be expressed by the following equation.

$$PR = \frac{P}{P_{MOT}} \quad [12]$$

Module 210 inputs in-cylinder pressure measurements and outputs PR according to Equation 12. Variable property computation module 220 inputs PR from module 210 and other calibration inputs describing heat release resulting from combustion known in the art, applies property correction equations, for example, as illustrated by Equation 11, and outputs $m_{fuel,net}$. Equations present in module 220 describe heat release from combustion neglecting heat loss. Heat loss and fuel quantity equivalent module 230 determines the heat loss component neglected in module 220 and outputs $M_{fuel,ht}$. Summation module 240 inputs $m_{fuel,net}$ and $m_{fuel,ht}$, sums the results, and determines $m_{fuel}$ or burnt fuel mass for the combustion cycle. In this way, pressure measurements can be utilized through a pressure ratio and variable property computations to determine burnt fuel mass.

The exemplary process 200 applies variable property computations to determine $m_{fuel}$. It will be appreciated that a number of permutations of equations are known in the art utilizing different assumptions. For example, $\Delta m_f$ or the burnt fuel mass between two crank time samples, assuming constant $\gamma$, can be expressed through the following equation.

$$\Delta m_f = \frac{V_{k+1}}{(\gamma - 1) \cdot Q_{LHV}} \left\{ P_{k+1} - P_k \cdot \left(\frac{V_k}{V_{k+1}}\right)^\gamma \right\} \quad [13]$$

Equation 13 allows for $\gamma$ to be input as a measured, calibrated, computed, or otherwise determinable value. In another example, $\gamma$ can be allowed to vary through a combustion process, as expressed by the following equation.

$$\Delta m_f = \frac{V_{k+1}}{(\gamma_k - 1) \cdot Q_{LHV}} \left\{ P_{k+1} - P_k \cdot \left(\frac{V_k}{V_{k+1}}\right)^{\gamma_k} \right\} \quad [14]$$

Equation 14 allows use of $\gamma_k$ to describe the effects of changing $\gamma$ through the combustion cycle. A computation of $\gamma$, varying according to temperature and charge mixture estimates, can be directly expressed by the following equation.

$$\Delta m_f = \frac{V_{k+1}}{Q_{LHV}} \left\{ \frac{1}{(\gamma_{T_{k+1}} - 1)} \cdot P_{k+1} - \frac{1}{(\gamma_{T_{exp}} - 1)} \cdot P_k \cdot \left(\frac{V_k}{V_{k+1}}\right)^{\gamma_{T_k}} \right\} \quad [15]$$

It will be appreciated that when appropriate, use of Equation 13 is preferred due to simplicity of using a fixed $\gamma$ term. However, when required based upon effects of changing property values or required increased accuracy of the output, Equation 14 or 15 can be utilized to determine the effects of $\gamma$ through a combustion cycle.

Figure 5:
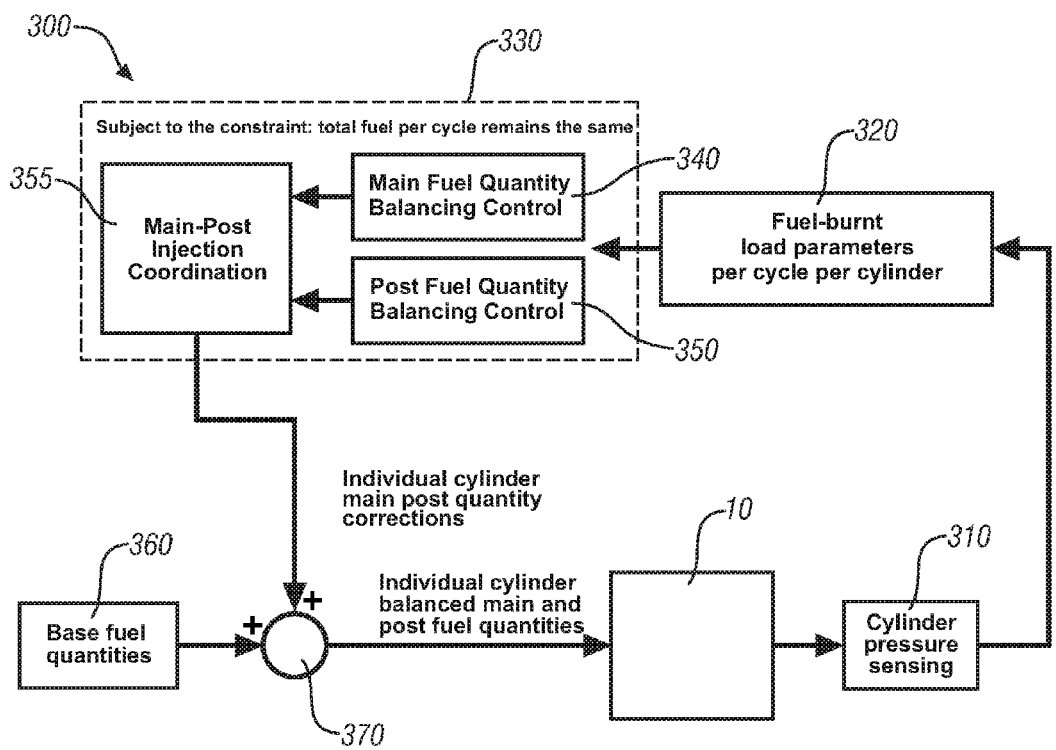
FIG. 5 schematically depict a system utilizing exemplary methods described herein to implement fuel quantity balancing control, in accordance with the present disclosure.

The methods described hereinabove are readily reduced to be programmed into a microcontroller or other device or devices for execution during ongoing operation of an internal combustion engine. FIG. 5 schematically depicts a system utilizing exemplary methods described herein to implement fuel quantity balancing control, in accordance with the present disclosure. System 300 includes engine 10, in-cylinder pressure sensing module 310, fuel-burnt parameters per cycle per cylinder module 320, fuel balancing module 330, base fuel quantities module 360, and summation module 370. Fuel balancing module 330 includes main fuel balancing control module 340, post fuel quantity balancing control module 350, and main-post injection coordination module 355. Fuel balancing module 330 can be operated with a constraint that the total fuel per cycle remains the same. Engine 10 operates and pressures within each cylinder are measured and output by cylinder pressure sensing module 310. Module 320 inputs pressure measurements from module 310 and outputs a multiple sample fuel burnt trace. Main fuel balancing control module 340 and post fuel quantity balancing control module 350 input multiple fuel-burnt samples at predefined crank-angles from the computer fuel burnt trace and utilize methods described herein to determine $\Delta Q_{main}$ and $\Delta Q_{post}$ appropriate to accurately control combustion in each of the cylinders of engine 10. Outputs from modules 340 and 350 are input to main-post injection coordination module 355 which outputs individual cylinder main and post quantity corrections. Base fuel quantities module 360 determines $Q_{main}$ and $Q_{post}$ or unmodified injection amounts for main and post injections, values determinable according to methods well known in the art. Outputs from modules 355 and 360 are summed in summation module 370 and generate an output of individual cylinder balance main and post fuel quantities to be commanded for subsequent operation of the engine. In this way, a system can be operated to monitor in-cylinder pressure measurements and operate fuel balancing methods to control fuel injection quantities in real time.

As described above, module 320 inputs pressure measurements from module 310 and outputs a multiple sample fuel burnt trace. The disclosure above describes methods for determining $\Delta m_f$ for use in creating the fuel burnt trace. Additional equations can be described for creating the fuel trace, for example the following equation.

$$Q_{LHV} \Delta m_f = m \cdot c_{v,T_{k+1}} \cdot T_{k+1} - m \cdot c_{v,T_{exp}} \cdot T_{exp} \quad [16]$$

$T_{exp}$ can be expressed as an intermediate temperature variable capturing the temperature changes due to volume change only based on an ideal isentropic expansion/compression relation. Such a relation is expressed in more detail below in Equation 21. Equation 16 can be solved for $\Delta m_f$ between $\theta_k$ and $\theta_{k+1}$. In the alternative, $\Delta m_f$ can be determined in terms of pressure variables according to the following equation.

$$\Delta m_f = \frac{V_{k+1}}{Q_{LHV}} \left\{ \frac{1}{(\gamma_{T_{k+1}} - 1)} \cdot P_{k+1} - \frac{1}{(\gamma_{T_{exp}} - 1)} \cdot P_k \cdot \left(\frac{V_k}{V_{k+1}}\right)^{\gamma_{T_k}} \right\} \quad [17]$$

As described above, $\gamma$ can vary through a combustion process. $\gamma_T$ can be determined according to the following equation.

$$\gamma_T = 1 + R/c_v(T) \quad [18]$$

The term $c_v(T)$ can be determined according to the following equation.

$$c_v(T) = (1 - \phi^* EGR)^* c_{v,air}(T) + (\phi^* EGR)^* c_{v,stoichprod}(T) \quad [19]$$

Changes to T through a combustion cycle according to $\theta$, starting from an initial temperature and corresponding volume, can be determined according to the following equations.

$$T(\theta_k) = PR(\theta_k) \left(\frac{V_0}{V(\theta_k)}\right)^{\gamma - 1} T_0 \quad [20]$$

$$T_{exp}(\theta_k) = T(\theta_k) \cdot \left(\frac{V(\theta_k)}{V(\theta_{k+1})}\right)^{\gamma - 1} \quad [21]$$

Similarly, the EGR content within the combustion chamber through a combustion cycle can be determined according to the following equation.

$$EGR(\theta_k) = EGR_{int} + COMB\_RAMP(\theta_k) \cdot (EGR_{final} - EGR_{int}) \quad [22]$$

COMB_RAMP($\theta_k$) is a combustion ramp function, describing combustion progress for crank-resolved values, can be determined according to the following expression:

$$COMB\_RAMP(\theta_k) = \begin{cases} 0 & \text{if } \theta_k < \theta_{comb,start} \\ \left(\dfrac{\theta_k - \theta_{comb,start}}{\theta_{comb,end} - \theta_{comb,start}}\right) & \text{if } \theta_{comb,start} \leq \theta_k \leq \theta_{comb,end} \\ 1 & \text{if } \theta_{comb,end} < \theta_k \end{cases} \quad [23]$$

Through these equations or through equivalent equations known in the art, a fuel burnt trace can be computed for use in methods described herein.

Figure 6A:
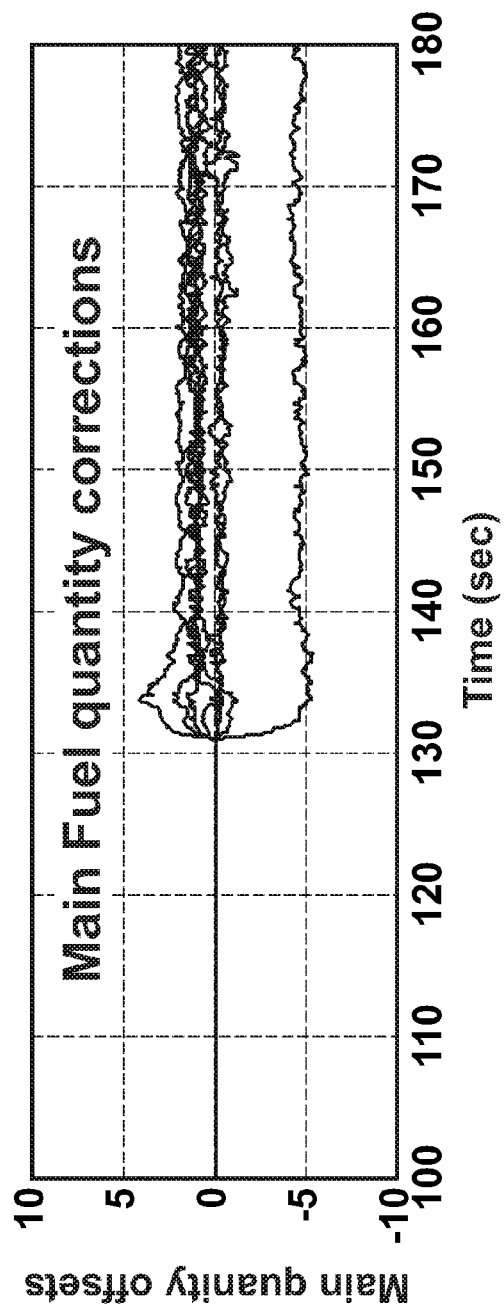
FIGS. 6A-6C graphically depict operation of an exemplary engine including a period of engine operation according to known fuel balancing methods and a period of engine operation according to fuel balancing methods disclosed herein, in accordance with the present disclosure.
Figure 6B:
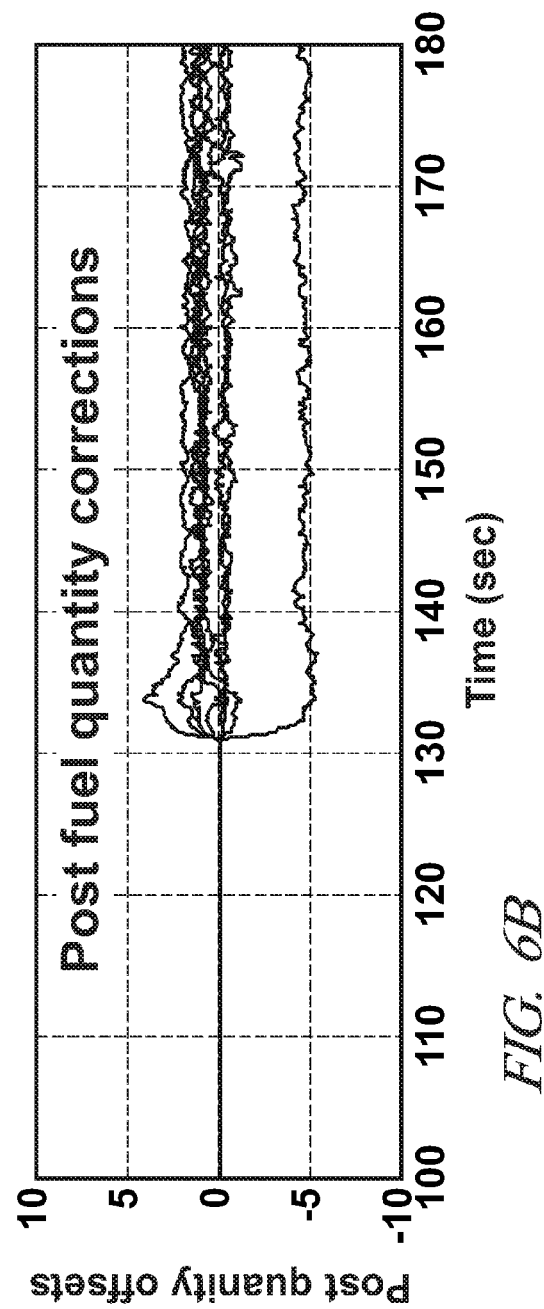
Figure 6C:
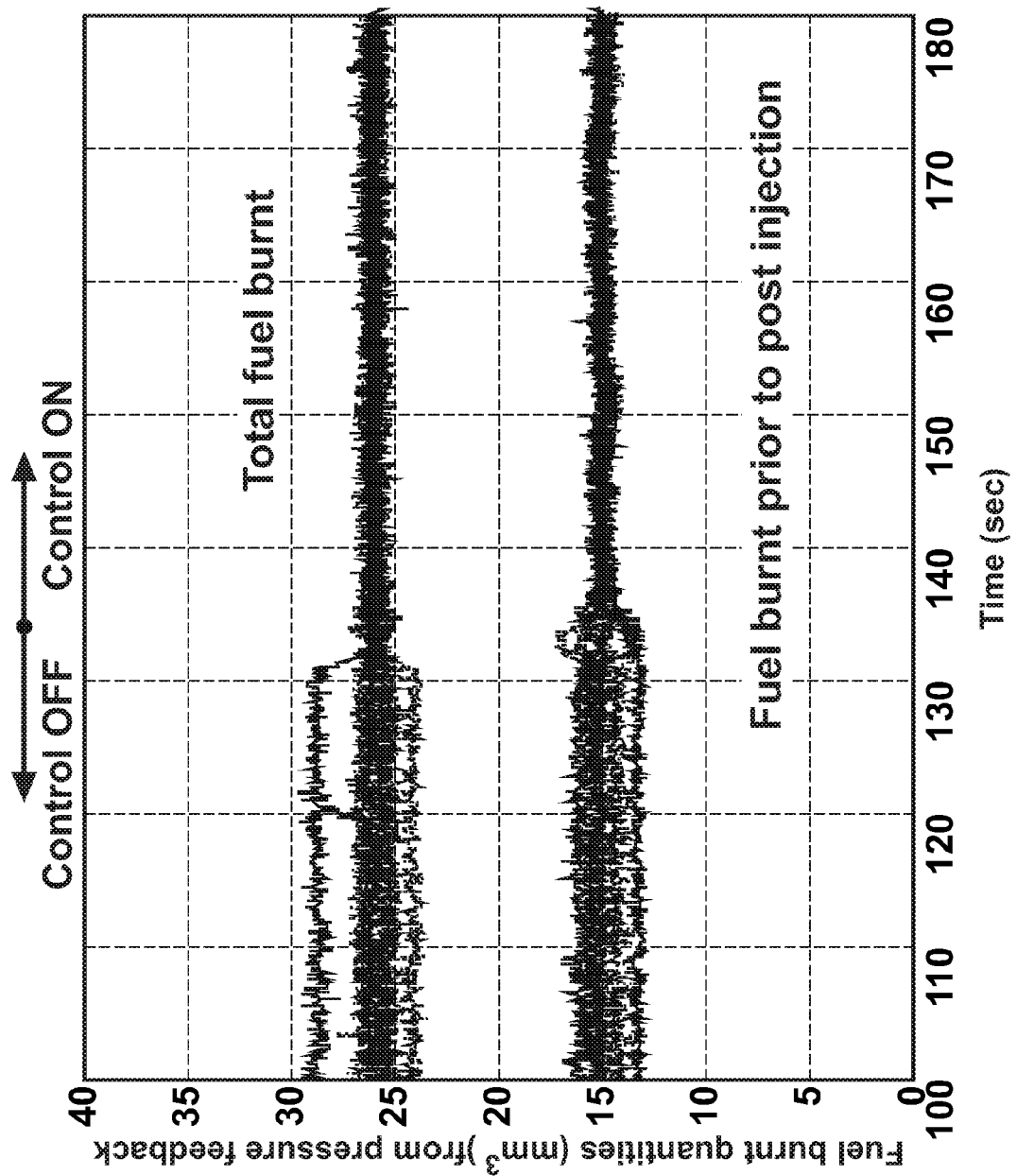

Test results show significant improvement in engine control results based upon methods described herein. FIGS. 6A-6C graphically depict operation of an exemplary engine including a period of engine operation according to a period of engine operation according to fuel balancing methods disclosed herein, in accordance with the present disclosure. Three different data graphic plots are depicted, with all three plots describing different metrics for the same test. A first graphic plot, FIG. 6A, shots main fuel quantity corrections or offsets commanded by use of the methods described herein. Before the methods are activated, known methods are utilized to command identical fuel injections into each of the depicted cylinders and no offsets are commanded. In the middle of the plot, the methods are activated, and resulting offsets to various cylinders are depicted. A second graphic plot, FIG. 6B, similarly depicts post fuel quantity offsets and similarly depicts values resulting from the methods being activated. The third graphic plot, FIG. 6C, depicts burnt fuel quantities for the tested configuration, with a clear transition depicted corresponding to the activation of the methods described herein. On the left side of FIG. 6C, prior to the activation of the balancing methods, the different cylinders, due to differences in the particular cylinders, fuel injection nozzles and delivery system, and other differences, each inject a different amount of fuel. As the methods described herein are activated, the amounts of fuel injected into each of the cylinders quickly converge into a substantially identical amount. The methods described herein allow for real-time balancing of fuel injection in an engine.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for adjusting fuel injection quantities in an internal combustion engine configured to operate multi-pulse fuel injections in a cylinder of the engine, the method comprising:
   monitoring in-cylinder pressure;
   determining a burnt fuel mass for main combustion based upon the in-cylinder pressure;
   determining a burnt fuel mass for post combustion based upon the in-cylinder pressure;
   determining a main fuel quantity offset based upon the burnt fuel mass for main combustion;
   determining a post fuel quantity offset based upon the burnt fuel mass for post combustion; and
   controlling fuel injections into the cylinder based upon the main fuel quantity offset and the post fuel quantity offset.

2. The method of claim 1, wherein monitoring the in-cylinder pressure comprises:
   monitoring in-cylinder pressure prior to a start of post combustion; and
   monitoring in-cylinder pressure after post combustion;
   wherein determining the burnt fuel mass for main combustion based upon the in-cylinder pressure comprises determining the burnt fuel mass for main combustion based upon the in-cylinder pressure prior to the start of post combustion; and
   wherein determining the burnt fuel mass for post combustion based upon the in-cylinder pressure comprises determining the burnt fuel mass for main combustion based upon the in-cylinder pressure prior to the start of post combustion and the in-cylinder pressure after post combustion.

3. The method of claim 1, further comprising:
   monitoring a desired total burnt fuel mass for a combustion cycle;
   wherein determining the main fuel quantity offset based upon the burnt fuel mass for main combustion is further based upon the desired total burnt fuel mass through the combustion cycle; and
   wherein determining a post fuel quantity offset based upon the burnt fuel mass for post combustion is further based upon the desired total burnt fuel mass through the combustion cycle.

4. The method of claim 1, further comprising:
   monitoring a desired fuel burnt for main combustion; and
   monitoring a desired fuel burnt for post combustion;
   wherein determining the main fuel quantity offset based upon the burnt fuel mass for main combustion is further based upon the desired fuel burnt for main combustion; and
   wherein determining the post fuel quantity offset based upon the burnt fuel mass for post combustion is further based upon the desired fuel burnt for post combustion.

5. The method of claim 4, further comprising:
   comparing the desired fuel burnt for main combustion to the burnt fuel mass for main combustion; and
   generating an alert if the desired fuel burnt for main combustion differs from the burnt fuel mass for main combustion by more than a threshold.

6. The method of claim 4, further comprising:
   comparing the desired fuel burnt for post combustion to the burnt fuel mass for post combustion; and
   generating an alert if the desired fuel burnt for post combustion differs from the burnt fuel mass for post combustion by more than a threshold.

7. The method of claim 1, wherein the internal combustion engine comprises a plurality of cylinders and wherein the method of claim 1 is repeated for each of said plurality of cylinders.

8. The method of claim 7, further comprising:
   determining a desired fuel burnt for main combustion comprising:
      determining an average of the respective burnt fuel masses for main combustion for the plurality of cylinders; and
      utilizing the average of the respective burnt fuel masses for main combustion as the desired fuel burnt for main combustion; and
   determining a desired fuel burnt for post combustion comprising:
      determining an average of the respective burnt fuel masses for post combustion for the plurality of cylinders; and utilizing the average of the respective burnt fuel masses for post combustion as the desired fuel burnt for post combustion; and wherein determining the main fuel quantity offset based upon the burnt fuel mass for main combustion is further based upon the desired fuel burnt for main combustion; and wherein determining the post fuel quantity offset based upon the burnt fuel mass for post combustion is further based upon the desired fuel burnt for post combustion.

9. The method of claim 1, wherein controlling fuel injections into the cylinder based upon the main fuel quantity offset and the post fuel quantity offset comprises controlling fuel injections in a subsequent combustion cycle.

10. The method of claim 1, wherein controlling fuel injections into the cylinder based upon the main fuel quantity offset and the post fuel quantity offset comprises controlling fuel injections in a plurality of subsequent combustion cycles.

11. The method of claim 1, further comprising:
determining a burnt fuel mass for pilot combustion based upon the in-cylinder pressure; and
determining a pilot fuel quantity offset based upon the burnt fuel mass for pilot combustion;
wherein controlling fuel injections into the cylinder is further based upon the pilot fuel quantity offset.

12. The method of claim 1, wherein controlling fuel injections into the cylinder comprises controlling a plurality of injections for main combustion.

13. The method of claim 1, wherein controlling fuel injections into the cylinder comprises controlling a plurality of injections for post combustion.

14. The method of claim 1, wherein post combustion is defined by a start of an injection for post combustion.

15. Method for adjusting fuel injection quantities in an internal combustion engine, the method comprising:
monitoring in-cylinder pressure within each of a plurality of cylinders of the engine;
determining a burnt fuel mass for main combustion for each of the cylinders based upon the respective in-cylinder pressure measurement for each of the plurality of cylinders;
determining a desired fuel burnt for main combustion based upon an average of the burnt fuel masses for main combustion for the plurality of cylinders;
determining a burnt fuel mass for post combustion for each of the cylinders based upon the respective in-cylinder pressure;
determining a desired fuel burnt for post combustion based upon an average of the burnt fuel masses for post combustion for the plurality of cylinders;
determining a main fuel quantity offset for each cylinder based upon comparing the respective burnt fuel mass for main combustion for the respective cylinder and the desired burnt fuel mass for main combustion;
determining a post fuel quantity offset for each cylinder based upon comparing the respective burnt fuel mass for post combustion for the respective cylinder and the desired burnt fuel mass for post combustion; and
controlling fuel injection of the engine based upon the main fuel quantity offsets and the post fuel quantity offsets.

16. The method of claim 15, wherein monitoring in-cylinder pressure comprises:
monitoring in-cylinder pressure prior to a start of post combustion for each of the plurality of cylinders; and
monitoring in-cylinder pressure after post combustion for each of the plurality of cylinders; and
wherein determining the burnt fuel mass for main combustion for each of the cylinders based upon the respective in-cylinder pressure comprises determining the burnt fuel mass for main combustion for each of the cylinders based upon the respective in-cylinder pressure prior to the start of post combustion for each of the plurality of cylinders; and
wherein determining the burnt fuel mass for post combustion for each of the cylinders based upon the respective in-cylinder pressure comprises determining the burnt fuel mass for post combustion for each of the cylinders based upon the respective in-cylinder pressure prior to the start of post combustion for each of the plurality of cylinders and the in-cylinder pressure after post combustion for each of the plurality of cylinders.

17. System for adjusting fuel injection quantities in an internal combustion engine configured to operate multi-pulse fuel injections in a cylinder of the engine, the system comprising:
a pressure sensor monitoring a pressure within the cylinder;
an engine control module controlling injections into the cylinder; and
a control module monitoring an output from the pressure sensor, determining a burnt fuel mass for main combustion based upon the output from the pressure sensor, determining a burnt fuel mass for post combustion based upon the output from the pressure sensor, determining a main fuel quantity offset based upon the burnt fuel mass for main combustion, determining a post fuel quantity offset based upon the burnt fuel mass for post combustion, and communicating the main fuel quantity offset and the post fuel quantity offset to the engine control module.

* * * * *